W. B. SWARTWOUT.
TEMPLE FOR SPECTACLES.
APPLICATION FILED SEPT. 28, 1910.
1,017,702.
Patented Feb. 20, 1912.
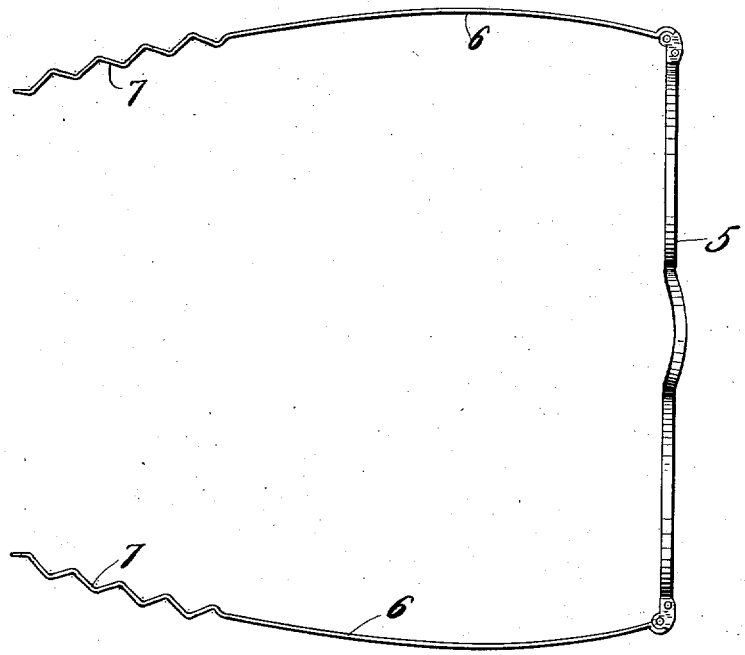

UNITED STATES PATENT OFFICE.

WILLIS B. SWARTWOUT, OF MILWAUKEE, WISCONSIN.

TEMPLE FOR SPECTACLES.

1,017,702. Specification of Letters Patent. Patented Feb. 20, 1912.

Application filed September 28, 1910. Serial No. 584,239.

*To all whom it may concern:*

Be it known that I, WILLIS B. SWARTWOUT, a citizen of the United States, residing in Milwaukee, in the county of Milwaukee and State of Wisconsin, have invented new and useful Improvements in Temples for Spectacles, of which the following is a description, reference being had to the accompanying drawings, which are a part of this specification.

This invention relates to improvements in spectacles and more particularly to the temples forming part of the spectacle frame.

One of the objects of this invention is to provide a spectacle frame with temples or bows which will securely hold the frame on the head of the wearer without liability of accidentally slipping off.

A further object of the invention is to provide a spectacle frame with temples which are so formed that they will engage the head of the wearer and distribute the strain of the pressure of the temples toward each other at a plurality of points.

A further object of the invention is to provide temples for spectacle frames which are of simple construction, reliable in action and durable in use and which are inexpensive to manufacture.

With the above, and other objects in view, the invention consists of the spectacle temples and their parts and combinations as set forth in the claims, and all equivalents thereof.

In the accompanying drawing in which the same reference characters indicate the same parts in all of the views: Figure 1 is a top view of a spectacle frame provided with the improved temples; and Fig. 2 is a side view of one of the temples.

Referring to the drawing the numeral 5 indicates a spectacle frame and 6 the temples or bows thereof which are hinged thereto in the ordinary manner. The outer or free end portions of the temples are flattened and corrugated or crimped in a direction toward each other, when in open position, as indicated by the numeral 7 so that when placed on the head of the wearer the projecting portions on the engaging faces of the temples will engage the head at a plurality of points and securely hold the spectacle frame in position and against accidentally slipping off the head.

From the foregoing description it will be seen that the spectacle temples are very simple in construction and are formed of a minimum number of parts and the corrugated portions of the temples serve to securely hold the spectacle frame in position on the head of the wearer.

What I claim as my invention is:

1. Spectacle temples, comprising members constructed to be connected at one end to a spectacle frame and having their opposite ends corrugated to engage the side of the head of the wearer, the corrugations extending along the engaging faces of temples.

2. A spectacle temple, comprising a member adapted to be connected to a spectacle frame at one end and having its other end flattened and corrugated to engage the side of the head of the wearer.

3. A spectacle temple, comprising members constructed to be connected at one end to a spectacle frame and having their opposite ends corrugated to engage the side of the head of the wearer, the corrugations being bent horizontally and the inwardly projecting portions which are adapted to engage the head being flattened.

In testimony whereof, I affix my signature in presence of two witnesses.

WILLIS B. SWARTWOUT.

Witnesses:
HARVEY J. KEEHEES,
CLARENCE F. PRESCOTT.

---

Copies of this patent may be obtained for five cents each, by addressing the "Commissioner of Patents, Washington, D. C."